United States Patent [19]
Lindsay et al.

[11] Patent Number: 5,507,377
[45] Date of Patent: *Apr. 16, 1996

[54] POSITIVE ENGAGEMENT SPRING CLUTCH FOR CONCENTRIC ROTATING DRIVES

[76] Inventors: Stuart M. W. Lindsay, R.R. 2 Lake Road Box 2248, Charlotte, Vt. 05445; James H. Wagner, 11 Wenonah Ave., Essex Junction, Vt. 05452

[ * ] Notice: The term of this patent shall not extend beyond the expiration date of Pat. No. 5,451,070.

[21] Appl. No.: 67,544

[22] Filed: May 26, 1993

[51] Int. Cl.⁶ .................................. F16D 11/16
[52] U.S. Cl. ............... 192/71; 192/89.2; 192/89.21; 192/108
[58] Field of Search .................. 192/71, 89 RS, 192/89 CR, 93 C, 107 T, 108, 89.2, 89.21; 403/329

[56] References Cited

U.S. PATENT DOCUMENTS

| | | | |
|---|---|---|---|
| 695,769 | 3/1902 | Turnbull | 192/71 X |
| 1,497,133 | 6/1924 | Cot | 192/71 X |
| 2,063,426 | 12/1936 | Galvin et al. | 192/71 |
| 2,828,845 | 4/1958 | Thornton | 192/71 X |
| 5,297,670 | 3/1994 | Yamaguchi | 403/329 X |

*Primary Examiner*—Richard M. Lorence
*Attorney, Agent, or Firm*—Donald W. Meeker

[57] ABSTRACT

Inserted in a hollow drive cylinder, a simple push-pull shaft is connected to a cup, open at one end and having a rigid rim and a transverse rod across the open end of the cup. Captured between the transverse rod and the closed end of the cup is a V-shaped spring. Two hardened steel pins on the outside ends of the V-shaped spring inserted through holes in a drive cylinder are inserted into and retracted out of engagement with openings on an interior surface of a concentrically encircling drive ring in response to expansions and compressions of the spring caused by the rim of the cup moved by the push-pull shaft. The push-pull shaft is moved by a push-pull knob outside the cylinder or cable activating knob remote therefrom. The rigid rim of the cup pushes on the sloping sides of the spring to compress the spring which then disengages the pins from the drive ring. Pulling back on the push-pull shaft withdraws the cup and releases the sides of the spring to allow the spring to expand and the the pins to engage the drive ring. The drive cylinder may drive the drive ring or the drive ring may drive the drive cylinder. A pair of concentric cylinders may also mutually drive each other.

18 Claims, 4 Drawing Sheets

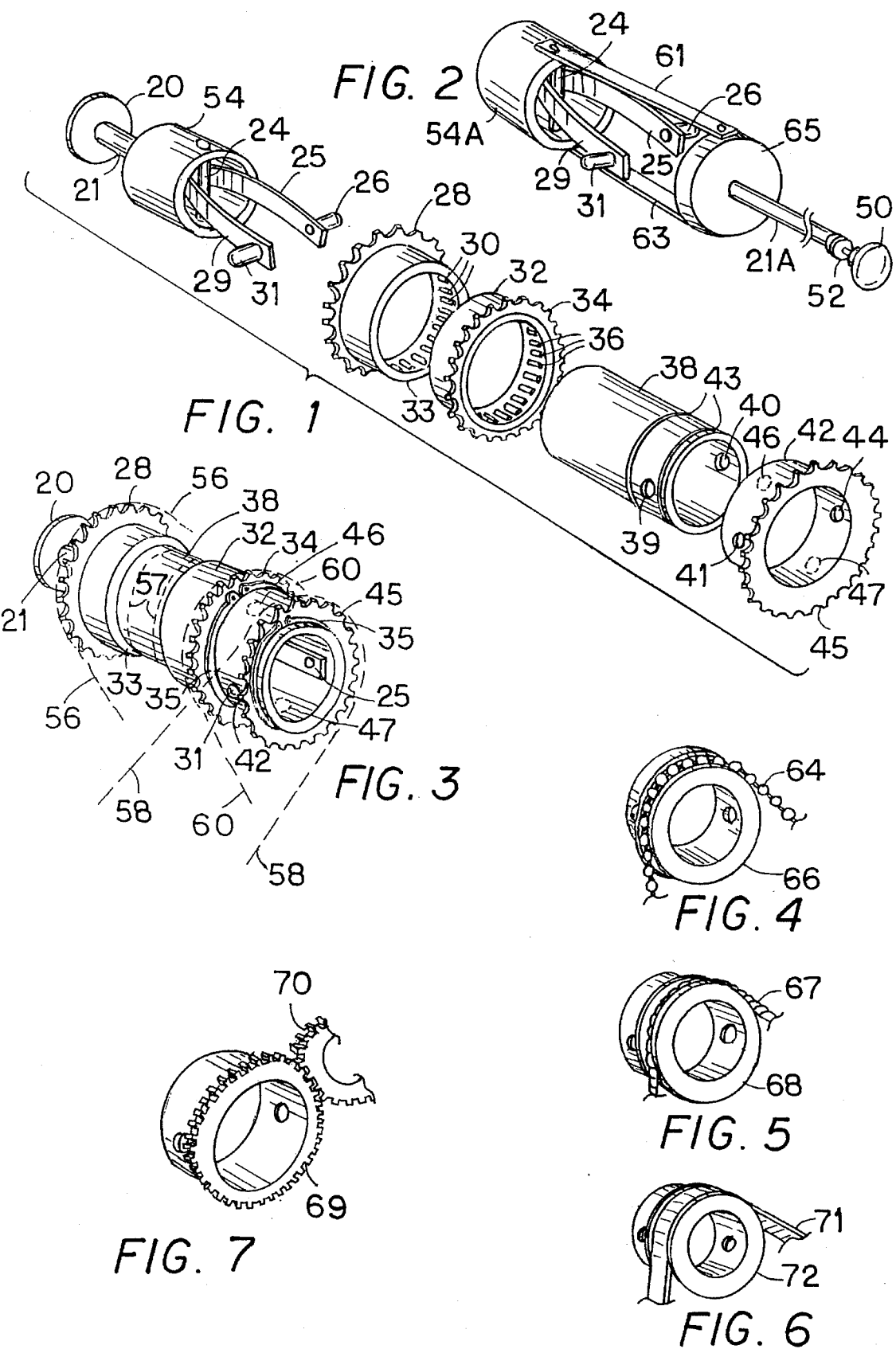

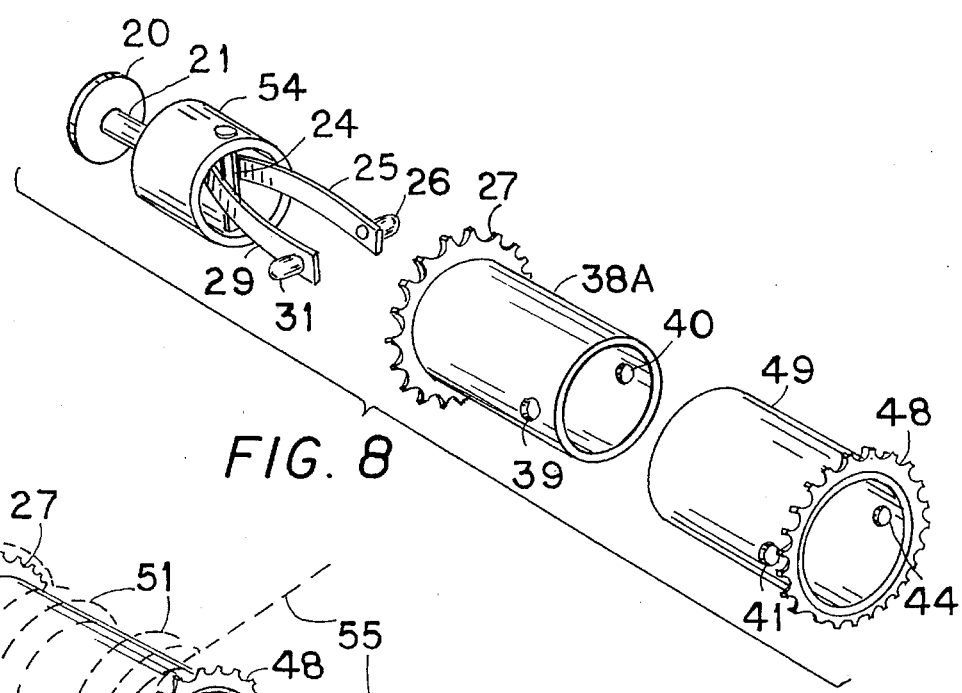
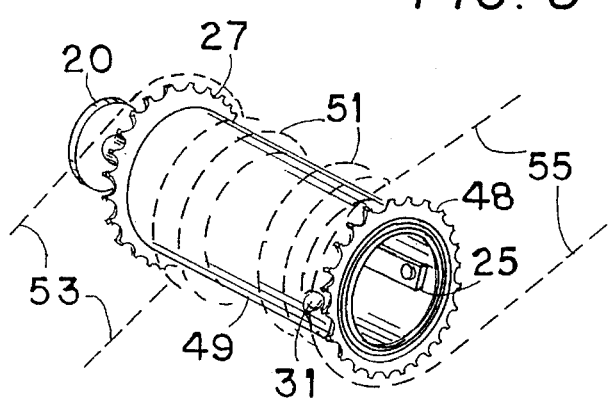
FIG. 8
FIG. 9

POSITIVE ENGAGEMENT SPRING CLUTCH FOR CONCENTRIC ROTATING DRIVES

BACKGROUND OF THE INVENTION

1. Technical Field

The present invention relates to positive engagement clutches and in particular to a positive engagement spring-loaded clutch for engaging and disengaging concentric rotating drives.

2. Description of the Prior Art

Providing nonslip high quality clutches while striving for low materials costs and ease and speed of fabrication, assembly, and use is a challenge. In most equipment involving transfer of rotational power some reliable clutch means is necessary to interrupt power transmission, and allow the components to move independently of each other.

Prior Art clutches typically involve rotating discs which engage and disengage with the rotating disc faces parallel to each other and face to face. Such friction clutches are expensive and overly complex for some applications and they also require lateral movement of at least one disc.

Some prior art transmissions with concentric rotating drives utilize expanding and contracting shoes within cylinders to engage and disengage the drives. Other prior art transmissions with concentric rotating drives utilize a single key in a groove of a shaft (keyway) selectively engaging and disengaging any of a series of gears concentrically positioned around the shaft along the length of the shaft.

DISCLOSURE OF INVENTION

The present invention provides a nonslip spring-actuated positive engagement clutch for concentrically related rotational devices with solid evenly balanced engagement on two opposing faces. Simply constructed of a high quality spring steel V-shaped spring and case hardened steel pins on the V-shaped spring with just a few small parts the present invention provides a high quality dependable clutch with low materials costs and ease and speed of fabrication, assembly, and use.

A hollow drive cylinder has opposing paired holes through the cylinder and a concentrically encircling drive ring has opposing paired mating openings on an interior surface. Sliding within the cylinder, a simple push-pull shaft is attached to a cup having an open end with a rigid rim and a transverse rod across the open end. A V-shaped spring is captured between the transverse rod and a closed end of the cup, wherein the spring has sloping sides protruding out of the cup and two hardened steel pins on the outside ends of the sides of the V-shaped spring. With the pins positioned in the paired holes of the cylinder, the rigid rim of the cup sliding against the sides of the spring causes expansion and compression of the spring, thereby causing the pins to insert into and retract out of engagement with the mating openings in the drive ring to engage and disengage the drive system positively and simply. Such a clutch mechanism with two case hardened pins in positive engagement on two opposing sides between a drive cylinder and a drive ring provides a clutch which is easily fabricated and installed, simply operated by a knob, cable, or any push-pull means, and fabricated at a small fraction of the cost of traditional clutch plate means, and does not require lateral movement.

Having the pins of the V-shaped spring always positioned within the holes in the drive cylinder and maintaining the drive ring always in the same transverse position relative to the drive cylinder, held by retaining rings, shoulders, press fit or other mechanical means, enables the drive system to be maintained in proper alignment at all times. Having multiple paired openings in the drive ring enables the pins to engage the drive ring with a minimum degree of rotation of the drive cylinder relative to the drive ring.

The drive cylinder may drive the drive ring and alternately the drive ring may drive the drive cylinder.

The present invention provides an economical and efficient clutch allowing engagement in applications up to approximately 150 rpm. The only engaged clutch limits are the shear strengths of the pins, which should be designed to accommodate the intended shear stress to be placed on the pins from very small precise instruments to very large powerful drivers.

DESCRIPTION OF THE DRAWINGS

These and other details and advantages of our invention will be described in connection with the accompanying drawings, which are furnished only by way of illustration and not in limitation of the invention, and in which drawings:

FIG. 1 is an exploded perspective view of the preferred embodiment of the positive engagement clutch components aligned for assembly;

FIG. 2 is a perspective of an alternate embodiment of the push-pull knob and V-shaped spring of the clutch;

FIG. 3 is a perspective view of the positive engagement clutch assembled;

FIG. 4 is a partial perspective view of an alternate embodiment of the drive ring using a beaded cable and roller gear;

FIG. 5 is a partial perspective view of an alternate embodiment of the drive ring using a cable and pulley;

FIG. 6 is a partial perspective view of an alternate embodiment of the drive ring using a belt and belt sleeve;

FIG. 7 is a partial perspective view of an alternate embodiment of the drive ring using a gear element and geared ring;

FIG. 8 is an exploded perspective view of an alternate embodiment of the positive engagement clutch components aligned for assembly;

FIG. 9 is a perspective view of the alternate embodiment of the positive engagement clutch components of FIG. 8 assembled;

BEST MODE FOR CARRYING OUT THE INVENTION

Figure 10:
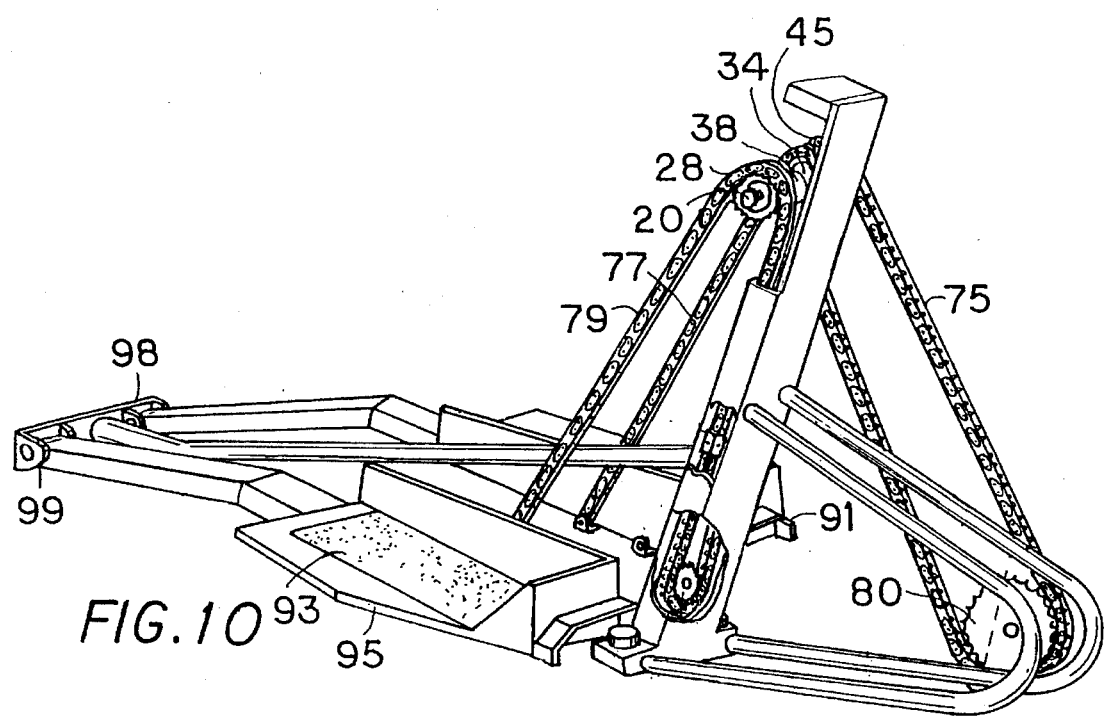
FIG. 10 is a perspective view of a treadle drive system with a positive engagement clutch.

In FIGS. 1 and 3 a positive engagement clutch comprises a hollow drive cylinder 38 connected with driving means 32 and 33 for rotating the drive cylinder and communicating means in the form of two opposing transverse holes 39 and 40 through the drive cylinder. At least one drive ring 42 concentrically encircles the drive cylinder 38, which drive ring drives an external rotating member. Or alternately the external rotating member may drive the drive ring, which would subsequently drive the drive cylinder. A pair of opposing spring loaded clutch elements 26 and 31 within the drive cylinder reversibly engage and disengage the drive ring via the holes 40 and 39 respectively through the drive cylinder and into mating opposing openings 44 and 41 in the drive ring 42.

Inserted within the hollow drive cylinder 38, is a simple push-pull shaft 21 having a push-pull means on an outer end outside the drive cylinder (attached knob 20 in FIG. 1 or remote cable 52 and actuating knob 50 alternate embodiment in FIG. 2). Rigidly connected to an inner end of the push-pull shaft, is a cup 54 with a rigid rim opening away from the push-pull shaft and the transverse rod 24 is attached across the open end of the cup. A V-shaped spring is captured between the transverse rod 24 and a closed end of the cup, wherein the spring has sloping sides 25 and 29 protruding out of the cup and two hardened steel pins 26 and 31 on the outside ends of the sides of the V-shaped spring. The pins 26 and 31 are normally inserted through the holes 40 and 39 in the drive cylinder 38 and into the openings 44 and 41 in the drive ring 42 with the pins held in place by the force of the V-shaped spring, thereby positively engaging the drive cylinder and the drive ring at two points.

Pushing the push-pull shaft 21 causes contact of the rigid rim of the cup with the two sloping sides 25 and 29 of the V-shaped spring to compress the sides of the V-shaped spring thereby retracting the pins 26 and 31 from the openings 44 and 41 in the drive ring 42 to disengage the drive ring from the drive cylinder. Pulling on the push-pull shaft 21 releases contact of the outer rim of the cup with the V-shaped spring enabling it to expand thereby causing the pins to insert back out into the openings in the drive ring, thereby re-engaging the drive cylinder and the drive ring. Additional mating opposing openings 46 and 47 (shown dashed on the drive ring) facilitate engagement of the pins in the openings with less degrees of rotation before engagement. No lateral displacement occurs between the drive cylinder and the drive ring due to retaining rings 35 (shown in FIG. 3) in cylinder grooves 43 (shown in FIG. 1), shoulders, press fit or other mechanical means, on both sides of the drive ring 42, enabling the drive system to be maintained in proper alignment at all times. In FIG. 3 the drive cylinder is rotatably supported by a bearing 57 (shown with dashed lines).

The width and depth of the cup and the position of the transverse rod can be used as control factors relative to the size and angle of the V-shaped spring, so that the push-pull shaft need only be moved a sufficient amount to engage and disengage the pins precisely without extra movement of the push-pull shaft.

In FIG. 2 an alternate embodiment of the push-pull assembly of the positive engagement clutch comprises a cup 54A opening into the drive cylinder with a rigid rim on an open end of the cup facing into the drive cylinder. Two opposing arms 61 and 63 are rigidly connected to the rigid rim of the cup 54A and extend through the drive cylinder. The two opposing arms at an opposite end are rigidly connected to a push-pull shaft 21A by a disc 65. A transverse rod 24 is attached between two opposing sides of the cup 54A. The pins 26 and 31 of the V-shaped spring normally inserted through the holes in the drive cylinder and into the openings in the drive ring with the pins held in place by the force of the V-shaped spring with sloping sides 25 and 29, thereby positively engaging the drive cylinder and the drive ring at two points.

Pulling the push-pull shaft causes contact of the rigid rim of the cup with the sloping sides of the V-shaped spring to compress the sides of the V-shaped spring thereby retracting the pins to disengage the drive ring from the drive cylinder. Pushing on the push-pull shaft causes the rigid rim of the cup to release the sloping sides of the V-shaped spring to expand causing the pins to insert into the openings in the drive ring, thereby re-engaging the drive cylinder and the drive ring.

In FIGS. 1 and 3 the driving means for rotating the driving cylinder comprises two sprocket drives (not shown) rotatably connected by a first pair of chains 56 and 60 (shown dashed) to a pair of sprocketed one-way drives 28 and 34, with roller clutches 30 and 36 on the interior of the sprocket drive rings 33 and 32, concentrically encirling the drive cylinder, and the drive ring which drives an external rotating member is a sprocket 45 on a drive ring 42 concentrically encircling the drive cylinder 38, wherein a second chain 58 from the sprocket ring drives an external sprocketed hub (not shown).

In FIG. 4 the driving means for rotating the driving cylinder comprises at least one roller clutch drive rotatably connected by a first beaded cable to at least one one-way clutch drive, with ramped one-way rollers on the interior of the roller clutch drive, concentrically encirling the drive cylinder, and the drive ring 42A which drives an external rotating member is a roller clutch ring concentrically encircling the drive cylinder 38, wherein a second beaded cable 64 from the roller gear ring drives a roller gear on an external rotating element.

In FIG. 5 the driving means for rotating the driving cylinder comprises at least one pulley drive rotatably connected by a first drive cable to at least one roller clutch pulley drive, with ramped one-way rollers on the interior of the pulley drive, and concentrically encircling the drive cylinder, the drive ring which drives an external rotating member is a pulley ring 68 concentrically encircling the drive cylinder, wherein a second drive cable 67 from the pulley ring drives a pulley on a rotating device.

In FIG. 6 the driving means for rotating the drive cylinder comprises at least one belt drive rotatably connected by a first belt to the drive cylinder, and the drive ring which drives an external rotating member is a belt ring 72 concentrically encircling the drive cylinder, wherein a belt 71 from the drive ring drives a rotating element on an external device.

In FIG. 7 the driving means for rotating the driving cylinder comprises at least one gear drive rotatably connected to at least one rotary and reversible geared drive, with rollers on the interior of the geared drive, concentrically encirling the drive cylinder, and the drive ring which drives an external rotating member is a geared ring 69 concentrically encircling the drive cylinder, wherein the geared ring drives a geared element 70 on a rotating device.

FIGS. 8 and 9 show an alternate embodiment of the positive engagement clutch wherein the drive ring comprises an elongated cylinder 49 concentrically encircling most of the drive cylinder 38A. In this embodiment drive elements 27 and 48 (in this case sprockets) are attached to the two drive elements. Opposing holes 39 and 40 in the drive cylinder 38A mate with opposing holes 41 and 44 in the elongated cylinder 49 allowing the pins 31 and 26 to engage the two drive elements through the holes in the drive cylinder and the openings in the drive ring. Bearings 51 (dashed lines) may support the elongated cylinder 49. Drive lines 53 and 55 (in this case chains, shown in dashed lines) connect with the two sprockets 27 and 48. Either cylinder may drive the other or disengage therefrom.

In FIG. 10 a treadle drive system employs a positive engagement clutch with push-pull knob 20, using chain and sprocket drives as seen in FIGS. 1 and 3. The positive engagement clutch allows the treadle drive system to engage with and disengage from the drive chain. The treadle drive system is powered by downward stepping motion on a pair of treadles 95 spaced apart in parallel with both treadles hinged 98 and 99 at a forward end and equipped with a foot-resting area 93 at a rearward end with a skid resistant surface. Each of two ends of a flexible drive line 77 and 79 is attached to an inside edge of each treadle 95 between the forward and rearward ends of the each treadle. The flexible drive line extends from each treadle upwardly to drive each of two parallel rotating driver means 28 and 34, which driver means each engage a drive cylinder or shaft 38 (in FIGS. 1 and 2), and the driver means alternately rotate the drive shaft in a forward direction with one-way roller clutches 30 and 36.

A third rotating ring, a driven means 45, is positioned in a disengageable rotational relation to the drive shaft 38, wherein the third rotating drive means drives an external rotating member, such as the sprocket 80 in FIG. 10 via the chain 75. In FIGS. 1 and 3 the third rotating drive or driven means comprises a drive ring 42 with a sprocket 45, in this embodiment concentrically encircling the drive shaft 38. Alternately the flexible drive line may comprise, as in FIG. 4, a beaded cable 64 and the drive or driven means comprise corresponding sprocket 66 with receptacles to accept the beads, or, in FIG. 5, a cable 67 and the drive or driven means comprise pulleys 68, as in FIG. 6, a belt 71 and the drive or driven means comprise belt sleeves 72, or, is in FIG. 7, a gear 70 and the drive or driven means comprises a gear 69.

The positive engagement clutch allows the treadle drive to engage with and disengage from the external rotating member. Any of the clutch mechanisms of FIGS. 1, 2, 8, and 9 may be used in the treadle drives of FIGS. 10 and 15.

Figure 11:
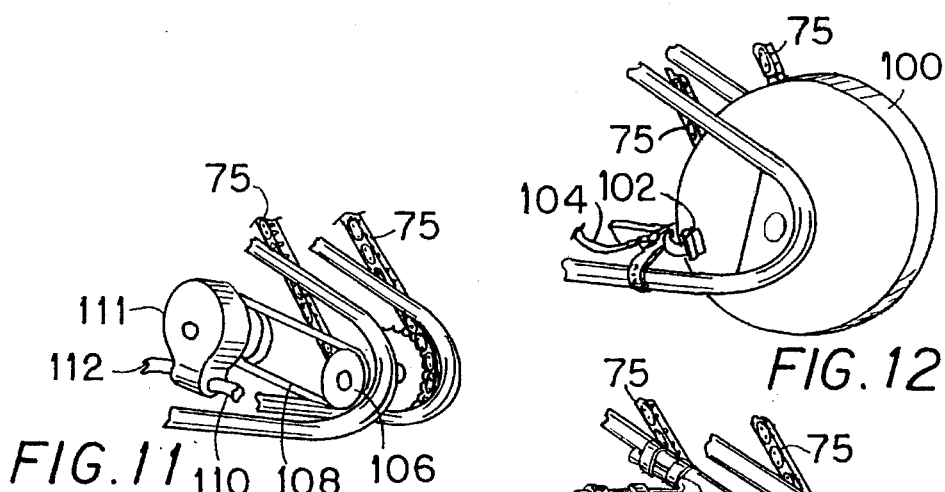
FIG. 11 is a partial perspective view of the drive system applied to a pump.

In FIG. 11 the external rotating member comprises an element on a pump 111 with a similar pulley 106 and V-belt 108 drive. Liquid is pumped through hoses 110 and 112 when the pump is activated by the drive chain 75 powered by the treadle drive system of FIG. 10. The positive engagement clutch allows the treadle drive to engage with and disengage from the pump, allowing the pump to idle or be turned by hand.

Figure 12:
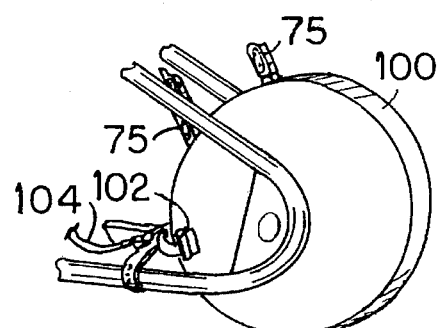
FIG. 12 is a partial perspective view of the drive system applied to a variable resistance exercise device.

In FIG. 12 the external rotating member comprises a variable resistance element such as a flywheel 100 on a piece of exercise equipment, with a variable resistance created by a brake 102 operated by a cable 104 wherein the flywheel is rotated by the drive chain 75 powered by the treadle drive system of FIG. 10. The positive engagement clutch allows the treadle drive to engage with and disengage from the flywheel.

Figure 13:
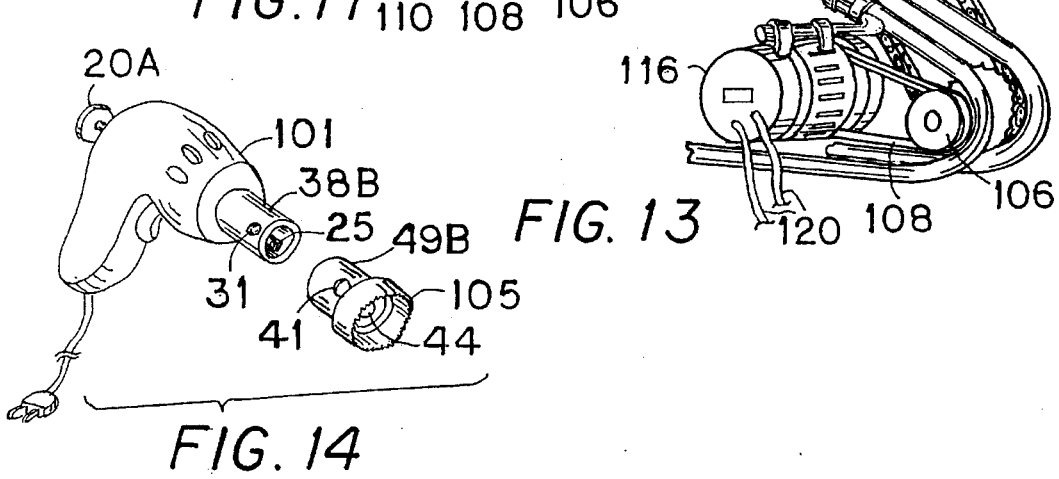
FIG. 13 is a partial perspective view of the drive system applied to a generator.

In FIG. 13 the external rotating member comprises an armature on an electric generator 116 which may be connected to the drive by a pulley 106 and V-belt 108. Electricity may be transmitted by wires 120 directly to an electric device or to a storage battery when the generator is activated by the drive chain 75 powered by the treadle drive system of FIG. 10. The positive engagement clutch allows the treadle drive to engage with and disengage from the generator, allowing the generator to idle or be turned by hand.

Figure 14:
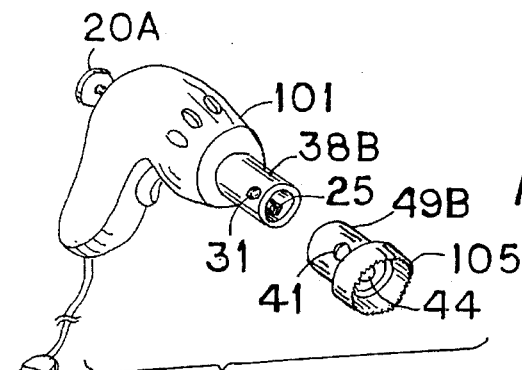
FIG. 14 is a partially exploded perspective view of another alternate embodiment of the positive engagement clutch used as both the attaching means and the power transmission means for attaching and powering a rotary head on a hand power tool.

In FIG. 14 the drive cylinder 38B extends out of a drive motor in a power tool 101 and the drive ring 49B comprises an element of a tool head 105 attached to the drive cylinder and driven by the positive engagement clutch engaged through drive ring openings 41 and 44 and operated by a push-pull knob 20A with a shaft extending through a hollow center of a rotor in the power tool attaching to the positive engagement clutch elements in the drive cylinder. The positive engagement clutch allows the drive motor to engage with and disengage from the tool head.

Figure 15:
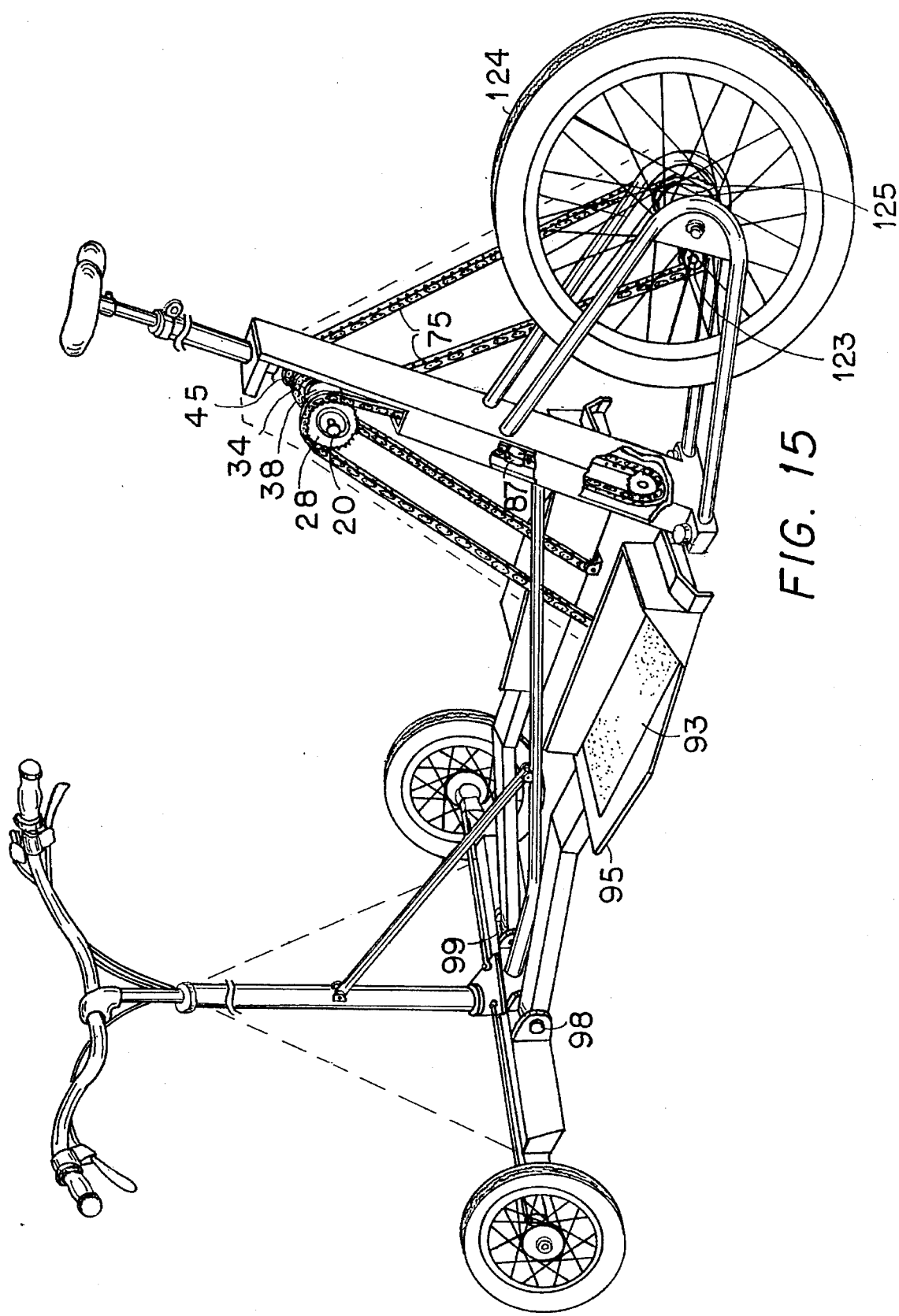
FIG. 15 is a perspective view of a three-wheeled vehicle employing the treadle drive system with a positive engagement clutch.

In FIG. 15 the external rotating member comprises the drive hub 125 of a multiple wheeled vehicle via a chain 75 and derailleur 123, wherein the multiple wheeled vehicle employs the treadle drive system of FIG. 10. The treadle drive system of FIG. 15 has the same components and functions in a similar fashion to the system of FIG. 10 and uses the positive engagement clutch to engage with and disengage from the hub 125 which drives the rear wheel 124, allowing a treadle cycle with such a clutch and treadle drive, when the clutch is disengaged, to be backed up without engaging the treadle drive.

Many other applications of the positive engagement clutch are possible including driving rotary tools and instruments. Small precision tools and instruments as well as large driving devices can use the positive engagement clutch effectively. The spring tension and the relative size of the cup and spring should be maintained to engage and disengage the pins effectively and maintain the pins engaged under load. The dimensions of the pins depends upon the amount of shear resistance required for the torque applied to the pins in different applications.

It is understood that the preceding description is given merely by way of illustration and not in limitation of the invention and that various modifications may be made thereto without departing from the spirit of the invention as claimed.

We claim:

1. A positive engagement clutch comprising:

a hollow drive cylinder connected with driving means for rotating the drive cylinder and communicating means through the drive cylinder;

at least one drive ring concentrically encircling the drive cylinder, which drive ring drives an external rotating member, wherein the drive ring may alternately drive or be driven by the drive cylinder;

a pair of opposing spring loaded clutch elements within the drive cylinder alternatively engaging and disengaging the drive ring via the communicating means through the drive cylinder;

wherein the hollow drive cylinder is provided with two opposing transverse holes through the drive cylinder and the drive ring is provided with at least two mating opposing openings in an interior surface contacting the drive cylinder; wherein the pair of spring loaded clutch elements engage and disengage the drive ring through the holes in the drive cylinder and the openings in the drive ring;

and further comprising, inserted within the drive cylinder, a simple push-pull shaft having a push-pull means on an outer end outside the drive cylinder, and, rigidly connected to an inner end of the push-pull shaft, a cup opening away from the push-pull shaft with an a rigid rim on an open end of the cup facing into the drive cylinder, and a transverse rod attached across the open end of the cup, and captured between the transverse rod and the cup, extending away from the push-pull shaft, a V-shaped spring having an open end formed by two sloping sides with a hardened steel pin on an outside face of each sloping side at an outer end, and wherein the hardened pins comprise the spring loaded clutch elements engaging and disengaging the drive ring and the drive cylinder, wherein the pins snap into and out of engagment with the drive ring to engage and disengage the drive ring with the drive cylinder.

2. The invention of claim 1 wherein the hardened pins are normally inserted through the holes in the drive cylinder and into the openings in the drive ring with the pins held in place by the force of the V-shaped spring, thereby positively engaging the drive cylinder and the drive ring at two points; wherein pushing the push-pull shaft causes contact of the rigid rim of the cup with the two sloping sides of the V-shaped spring to compress the sides of the V-shaped spring thereby retracting the pins from the openings in the drive ring to disengage the drive ring from the drive cylinder, and pulling on the push-pull shaft releases contact of the rigid rim of the cup with the V-shaped spring sides enabling the V-shaped spring to expand thereby releasing the sides of the spring to expand the spring causing the pins to insert out into the openings in the drive ring, thereby re-engaging the drive cylinder and the drive ring.

3. The invention of claim 1 wherein the push-pull means comprises a knob external to the drive cylinder, which knob is manually operable.

4. The invention of claim 1 wherein the drive ring comprises additional paired mating openings around its interior surface.

5. The invention of claim 1 further comprising a drive means between the drive ring and the external rotating member, wherein the external rotating member comprises a wheel driving a multiple wheeled vehicle.

6. The invention of claim 5 wherein the driving means on the drive cylinder is turned by a drive means activated by treadles.

7. The invention of claim 1 further comprising a drive means between the drive ring and the external rotating member, wherein the external rotating member comprises a generator.

8. The invention of claim 1 further comprising a drive means between the drive ring and the external rotating member, wherein the external rotating member comprises a variable resistance wheel on a piece of exercise equipment.

9. The invention of claim 1 wherein the driving means for rotating the driving cylinder comprises at least one sprocket drive rotatably connected by at least one chain to at least one second sprocketed drive concentrically encirling the drive cylinder, and the drive ring which drives an external rotating member is a sprocket on a sprocket ring concentrically encircling the drive cylinder, wherein a second chain from the sprocket ring drives an external sprocketed hub.

10. The invention of claim 1 wherein the driving means for rotating the driving cylinder comprises at least one gear drive rotatably connected to at least one second gear drive concentrically encirling the drive cylinder, and the drive ring which drives an external rotating member is a geared ring concentrically encircling the drive cylinder, wherein the geared ring drives a geared element on a rotating device.

11. The invention of claim 1 wherein the driving means for rotating the driving cylinder comprises at least one pulley drive rotatably connected by a first drive cable to at least one second pulley drive concentrically encircling the drive cylinder, and the drive ring which drives an external rotating member is a pulley ring concentrically encircling the drive cylinder, wherein a second drive cable from the pulley ring drives a pulley on a rotating device.

12. The invention of claim 1 wherein the driving means for rotating the drive cylinder comprises at least one belt drive rotatably connected by at least one belt to the drive cylinder, and the drive ring which drives an external rotating member is a belt ring concentrically encircling the drive cylinder, wherein a belt from the drive ring drives a rotating element on an external device.

13. The invention of claim 1 wherein the driving means for rotating the driving cylinder comprises at least one beaded-cable compatible drive rotatably connected by a first beaded cable to at least a second-beaded cable compatible drive, concentrically encircling the drive cylinder, and the drive ring which drives an external rotating member is a beaded-cable compatible ring concentrically encircling the drive cylinder, wherein a second beaded cable from the beaded-cable compatible ring drives a roller gear on an external rotating element.

14. The invention of claim 1 wherein the shaft extension comprises a cup opening into the drive cylinder with a rigid rim on an open end of the cup facing into the drive cylinder, two opposing arms rigidly connected to the rigid rim of the cup and extending through the drive cylinder, wherein the two opposing arms, at an opposite end, are rigidly connected to a disc and to a push-pull shaft, and the transverse rod is attached between two opposing sides of the open end of the cup, and wherein the pins are normally inserted through the holes in the drive cylinder and into the openings in the drive ring with the pins held in place by the force of the V-shaped spring, thereby positively engaging the drive cylinder and the drive ring at two points; wherein pulling the push-pull shaft causes contact of the rigid rim of the cup with the sloping sides of the V-shaped spring to compress the sides of the V-shaped spring thereby retracting the pins to disengage the drive ring from the drive cylinder, and pushing on the push-pull shaft causes the rigid rim of the cup to release the sloping sides of the V-shaped spring causing the spring to expand and the pins to insert back into the openings in the drive ring, thereby re-engaging the drive cylinder and the drive ring.

15. The invention of claim 14 further comprising a control cable attached to the push-pull shaft enabling remote operation of the push-pull shaft.

16. The invention of claim 1 wherein the drive ring drives and alternately is driven by the drive cylinder.

17. The invention of claim 1 wherein the drive ring comprises an elongated cylinder concentrically encircling most of the drive cylinder.

18. The invention of claim 1 wherein the drive cylinder mechanically connects to and extends out of a drive motor in a power tool and the drive ring comprises an element of a tool head both attached to the drive cylinder by the positive engagement clutch and driven by the positive engagement clutch.

* * * * *